May 10, 1955  A. B. SOWTER  2,707,826
METHOD OF MAKING COLD WELDED WIRE JOINTS
Filed Feb. 29, 1952
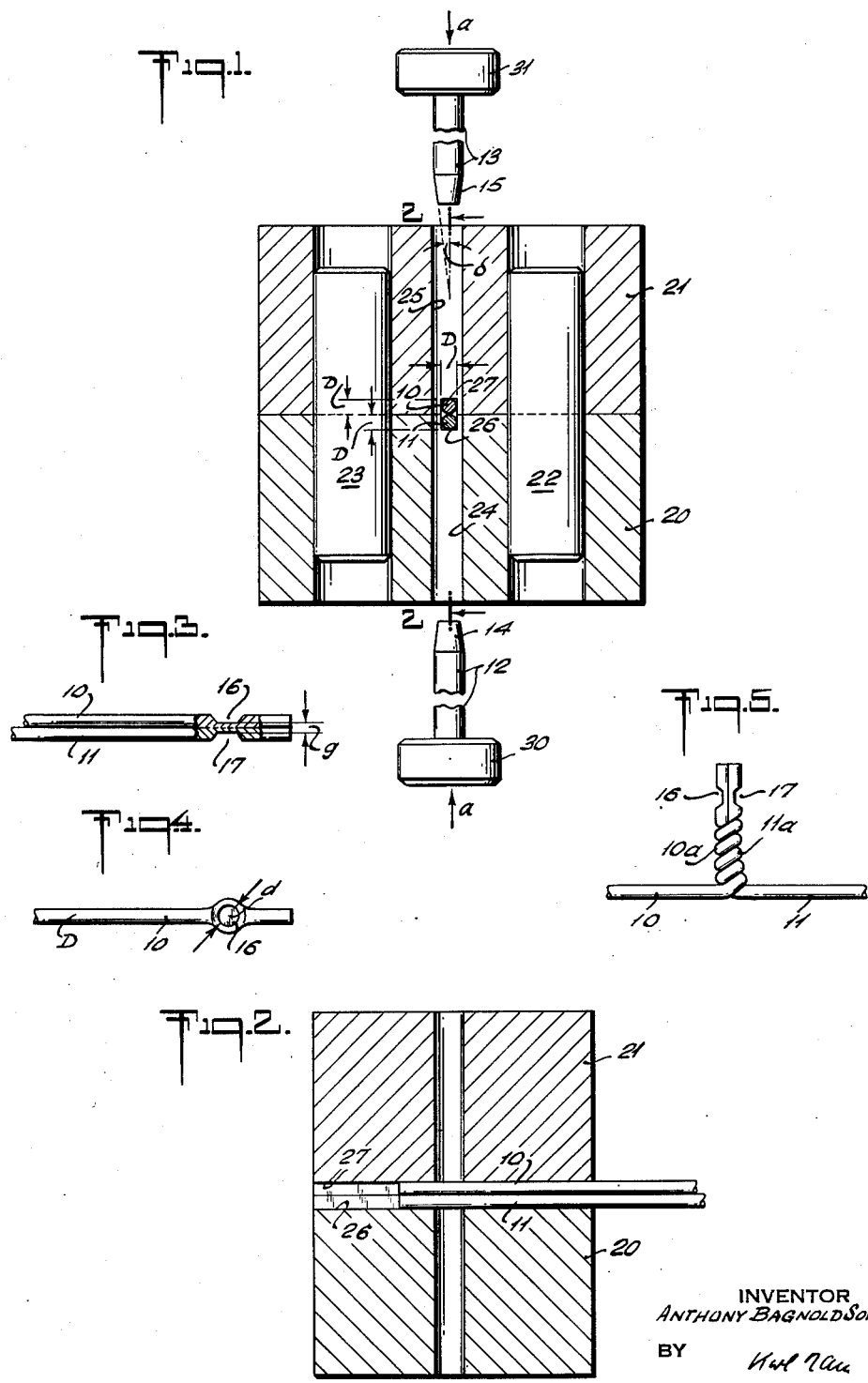
INVENTOR
ANTHONY BAGNOLD SOWTER.
BY
ATTORNEY

United States Patent Office 2,707,826
Patented May 10, 1955

2,707,826
METHOD OF MAKING COLD WELDED WIRE JOINTS

Anthony Bagnold Sowter, Wembley, England, assignor to The General Electric Company Limited, London, England Application February 29, 1952, Serial No. 274,098
Claims priority, application Great Britain March 16, 1951

3 Claims. (Cl. 29—470.1)

The present invention relates to pressure welding, such as cold pressure welding, and more particularly to a method of and means for joining a pair of metal wires of ductile cold-weldable metal, such as for making connections between electrical conductors in telephone cables or other electrical devices.

According to known methods of making electrical wire joints, the end portions of two wires to be joined are bent at right angles and twisted together, allowing the ends of the wires to lie together straight and parallel to one another. A connection is then made by soldering the ends to effect a low resistance electrical connection between the wires. While, when copper is used, soldering techniques, though cumbersome and requiring considerable time, or simple mechanical clamping may be satisfactory for certain purposes and applications, soldering of aluminum involves great difficulties which are well known. Clamping, on the other hand, has been found unsatisfactory since, even if the wires are cleaned to remove the oxide coating from the aluminum surface, the coating will build up again with time, thus causing the electrical connection to deteriorate, since aluminum oxide is a non-conductor or electrical insulator. Other difficulties encountered in making constant and low-resistance wire joints between telephone wires or other electrical conductors are well known.

While it has already been proposed to join the ends of two rods, wires, etc. by cold pressure welding, such as by flattening the wire ends to be joined before or during welding, as described in my pending patent applications Serial Nos. 138,535, filed January 14, 1950, entitled Means for Cold Pressure Welding, 165,904, filed June 3, 1950, entitled Means for and Method of Making Wire Joints by Cold Pressure Welding, and 227,358, filed May 21, 1951, entitled Joining of Wires by Pressure Welding, the previous techniques become more and more unsuitable and finally impractical as the diameter of the wires is decreased to smaller values as used, among others, in telephone cables and other electrical signalling or low-current devices.

Accordingly, an object of the present invention is the provision of a simple method of and means for cold welding the ends of a pair of metal wires or conductors to effect an efficient and low-resistance electrical connection.

A more specific object of the invention is to provide a simple method of and means for joining electrical wires of comparatively small diameter, such as the electrical conductors in telephone cable joints and equivalent electrical devices.

The above and further objects and novel aspects of the invention will be better understood from the following detailed description, considered in conjunction with the accompanying drawing, forming part of this specification, and wherein:

Figure 1 is a vertical cross-section through a tool assembly for cold welding together the ends of a pair of metal wires in accordance with this invention, the parts being shown in their position prior to welding;

Figure 2 is a sectional view taken on line 2—2 of Figure 1;

Figures 3 and 4 are side and plan views, respectively, the former being shown partly in section, of a wire joint obtained by means of the tool according to Figures 1 and 2; and Figure 5 shows a final wire joint or electrical connection according to the invention.

Like reference characters identify like parts in the several views of the drawing.

While the invention is especially applicable to cold pressure welding, that is, the welding of two wires substantially by pressure and without the supply of external heat, it will be understood that some heat may be used, such as by heating the welding tools or preheating the wires provided, however, that welding is effected predominantly by the plastic flow of the metals at the surfaces being joined as a result of the applied welding pressure.

Furthermore, while the method of making cold-welded wire joints according to the invention is especially applicable to the joining of wires of comparatively small diameters, such as the electrical conductors in cable joints or other electrical apparatus, it will be understood that the invention may be used with equal advantage for joining wires of greater diameter, where a single spot weld or a series of spot welds are sufficient in providing the desired joint or connection.

More specifically, in carrying the invention into effect as illustrated by the drawing, Figures 1 and 2, two wires 10 and 11 of copper, aluminum or other ductile cold-weldable metal or metal alloy, are laid with their end portions to be joined one upon and in line or parallel with the other and pressure welded together by the aid of a pair of cooperating circular faced welding tools or pins 12 and 13 having tapering welding tips 14 and 15, respectively, with the taper angle δ being of about 15°. The ends of the wires 10 and 11 or areas of contact to be joined are suitably pre-cleaned, such as by subjecting them to scratch-brush treatment or by scraping with a knife blade the portions to be welded, to remove the surface oxide and other foreign matter and to provide clean metallic surfaces prior to welding. In many cases pre-cleaning may, however, be dispensed with, in that the applied welding pressure may be sufficient to crack and destroy the thin oxide film so as to allow of a merging or interlacing of the metals of the adjoining surfaces at the weld spot to effect an intimate and solid phase welding bond.

Upon bringing the tools 13 and 14 to bear upon the superposed wires, as indicated by the arrows $a$ in Figure 1, the metal of the adjoining surfaces at the weld spot will be caused to flow laterally of the initial longitudinal contacting line of the wires, as a result of the round or curved shape of the contacting surfaces, thus causing a merging or intimate welding together of the metals in such a manner as to form a solid phase welding bond. The minimum total percentage reduction at the weld spot or the final gap $g$, Figure 3, between the tools necessary to insure good welding, depends upon the characteristics of the material, being about 80% in the case of copper and about 60% in the case of aluminum, the exact value depending upon the desired mechanical strength of the joint and efficiency of the electrical connection.

In the case of pure electric conductors, where mechanical strength is of secondary importance or obtained by other means, such as by twisting the wires in the manner shown in Figure 5, the minimum percentage reduction may be equal to or exceed the upper limit, that is, 60% in the case of aluminum, and 80% for copper, in the interest of obtaining an efficient and low-resistance electrical connection between the wires. Furthermore, even though the thickness of the metal or gap $g$ at the weld spot or indentations 16 and 17, Fig. 3, may be very thin, the metal around the indentations or depressions 16 and 17 will insure both a good electrical connection and a reasonably strong mechanical joint between the wires.

In order to locate and hold the wires in properly aligned position during welding and to prevent slipping, while allowing of a ready lateral metal flow at the weld spot to enable merging of the metals and welding in the manner described, there is shown in Figures 1 and 2 a jig or tool assembly cooperating with the tool members or pins 13 and 14, all being advantageously incorporated in a hand press or other pressure producing device.

There is shown for this purpose a welding tool comprising lower and upper anvils or jig halves 20 and 21, the latter being removably mounted upon the former with the dowels 22 and 23 serving to insure proper alignment of the anvils. To this end, the dowels may be press fitted in the lower anvil 20 and form a sliding fit with the upper anvil 21. Both anvils are furthermore provided with centrally aligned vertical bores 24 and 25, respectively, having a diameter equal to the diameter of the pressure pins 12 and 13, to allow the latter to slide freely but snugly within said bores.

The anvils 20 and 21 are furthermore provided at their adjoining surfaces with opposed and centrally aligned horizontal grooves or recesses 26 and 27 intersecting the bores 24 and 25 and having a depth and width equal to the diameter of the wires 10 and 11, whereby the latter fit closely and snugly therein in superposed relation, in the manner shown in the drawing.

As a result, the wires 10 and 11 will be located and contained in proper position during welding, substantially without any likelihood of slipping or dislocation during welding, while the reduced diameter of the welding tips 14 and 15 or pressure applying surfaces of the pins 12 and 13 compared with the diameter of the bores 24 and 25 will enable the metal at the welding or pressure spot to flow laterally of the initial contacting line and radially outwardly and beyond the weld area of the wires so as to produce a solid phase weld or joint of a shape as shown in Figures 3 and 4.

For practical results it has been found that the diameter $d$ of the circular pressure applying area of the welding tips 14 and 15 should be about equal or of the order of the diameter D of the wires to be welded. The percentage reduction of the metal at the weld spot or thickness of the gap $g$ may be controlled in any suitable manner, such as by a pair of outer heads 30 and 31 of the pins 12 and 13, respectively, acting as stops or abutments upon engaging the outer faces of the anvils 20 and 21.

As pointed out, the invention, without being limited thereto, is especially suitable for making electrical connections or joints between electrical wires such as used in telephone cables or the like. In this respect, the invention replaces the present electrical connections made by means of soldering or clamping, especially in the case of aluminum conductors, being more and more used in place of copper as a conducting material for the reasons pointed out hereinabove. Furthermore, the invention presents advantages of providing a more constant and efficient electrical connection between the wires as a result of the intimate connection of the metals into a solid phase weld or bond, especially when using a relatively high percentage reduction at the weld. This, in turn, enables the making of aluminum wire joints of a low electrical resistance and having other desirable electrical characteristics comparable or equal to copper wire joints as used heretofore.

Figure 5 illustrates a completed wire joint of the type according to the invention with the adjoining portions 10a and 11a of the wires adjacent to the weld being twisted to provide added mechanical strength and to relieve the joint or weld proper, in the manner pointed out above. This combination of twist and pressure weld also insures adequate strength to withstand bending back into line the conductors prior to the application of an insulating sleeve, while providing a low and constant electrical resistance of the joint.

In the foregoing the invention has been described with reference to a specific illustrative device. It will be apparent, however, that variations and modifications, as well as the substitution of equivalent elements and steps for those shown and described herein, may be made without departing from the broader scope and spirit of the invention as set forth in the appended claims. The specification and drawing are accordingly to be regarded in an illustrative rather than in a limiting sense.

I claim:

1. A method of joining a pair of cold pressure weldable members of substantially circular cross-section comprising superimposing said members with the portions to be joined contacting each other at an interface of relatively limited area, applying to opposed circular welding areas of the contacting portions having a diameter of the order of the diameter of said members a pressure in a direction substantially at right angle to the common tangential plane of the contacting members, to effect indentations of said members at said areas and to distort the metal thereof at and adjacent to the interface to change the same from its initial limited area into an extended lateral area and to produce circular projections by the displaced metal extending beyond the outer confines of said members, thereby to create an intensive metal flow at the extended interface sufficient to weld said members by a solid phase welding bond.

2. A method of joining a pair of cold pressure weldable members of substantially circular cross-section comprising arranging said members with the portions to be joined contacting each other at an interface of relatively limited area, applying to opposed circular welding areas of the contacting portions having a diameter of the order of the diameter of said members a pressure in a direction substantially at right angle to the common tangential plane of the contacting members, to effect indentations of said members and to distort the metal thereof at and near the interface to change the same from its initial limited area into an extended lateral area, and continuing the pressure application until the combined cross-sectional metal thickness at said welding areas is at least about 40% of the total initial metal thickness, to produce a circular projection by the displaced metal extending beyond the outer confines of said members and to create an intensive metal flow at the extended interface sufficient to weld said members by a solid phase welding bond.

3. A method of joining a pair of wires of cold pressure weldable metal comprising arranging the portions of the wires to be joined in aligned contacting relation so as to engage one another at a substantially linear interface, applying to opposed circular areas of the contacting wires having a diameter of the order of the diameter of the wires a pressure substantially in a direction at right angle to the common tangential plane of the contacting wires, to effect indentations of said wires at said areas and to distort the metal at and near the interface to change the same from its initial linear configuration into an extended lateral area and to produce circular projections by the displaced metal extending beyond the outer confines of said wires, thereby to create an intensive interfacial metal flow at the extended interface conducive to welding said wires by a solid phase welding bond.

References Cited in the file of this patent

UNITED STATES PATENTS

| | | |
|---|---|---|
| 697,648 | McCallum | Apr. 15, 1902 |
| 1,560,820 | Hunter | Nov. 10, 1925 |
| 1,618,764 | Lunn | Feb. 22, 1927 |
| 1,738,592 | Leonard | Dec. 10, 1929 |
| 2,522,408 | Sowter | Sept. 12, 1950 |

OTHER REFERENCES

Welding Journal (pp. 149–152), February 1949.